United States Patent

Paine et al.

[15] 3,638,066

[45] Jan. 25, 1972

[54] CONTOUROGRAPH SYSTEM FOR MONITORING ELECTROCARDIOGRAMS

[72] Inventors: Thomas O. Paine, Administrator of the National Aeronautics and Space Administration with respect to an invention of; Donald P. Golden, Jr., Webster; Donald G. Mauldin, Houston; Roger A. Wolthuts, Seabrook, all of Tex.

[22] Filed: Aug. 21, 1970

[21] Appl. No.: 65,840

[52] U.S. Cl. ................................................315/25, 315/22
[51] Int. Cl. ...................................................H01j 29/70
[58] Field of Search ............315/19, 25; 128/2.06 R, 2.06 G, 128/2.06 A

[56] References Cited

UNITED STATES PATENTS 3,457,452  7/1969  Saper...................................315/25 X

OTHER PUBLICATIONS

Webb et al., The Contourograph, 6- 1966, IEEE Spectrum, pp. 77, 78, 83- 87.

*Primary Examiner*—Rodney D. Bennett, Jr.
*Assistant Examiner*—J. M. Potenza
*Attorney*—Marvin J. Marnock, Marvin F. Matthews and John R. Manning

[57] ABSTRACT

The system of the present invention processes semiperiodic electrical signals such as an electrocardiogram to produce a real time signal display on the face of a variable persistence cathode ray tube in an oscilloscope. Each cycle of the signal being processed is formed on a separate horizontal base line which is spaced vertically below the trace formed by the preceding cycle. Each of the waveforms is organized about a prominent cyclical event with all similar events aligning in approximately the same vertical plane. The system intensifies portions of each trace to produce a three-dimensional contour effect. The resultant display called a contourogram tends to suppress cycle-to-cycle redundancies and to emphasize cycle-to-cycle differences which increases the ability to visually detect any waveform anomalies representative of an abnormality associated with the signal source. Real time display of a single, full cycle of the signal on one horizontal base line, even where no prominent or detectable signal excursion marks the beginning on one cycle and the end of the preceding cycle is effected by keying the oscilloscope sweep trace for the beginning of the real time cycle to a dominant event in the preceding cycle with circuitry which provides a delay between the occurrence of the signaling event and the initiation of the sweep for forming the following, real time trace.

5 Claims, 5 Drawing Figures

PATENTED JAN 25 1972

INVENTORS
DONALD P. GOLDEN JR.
DONALD G. MAULDIN
ROGER A. WOLTHUIS

BY

M J Marnock

ATTORNEY

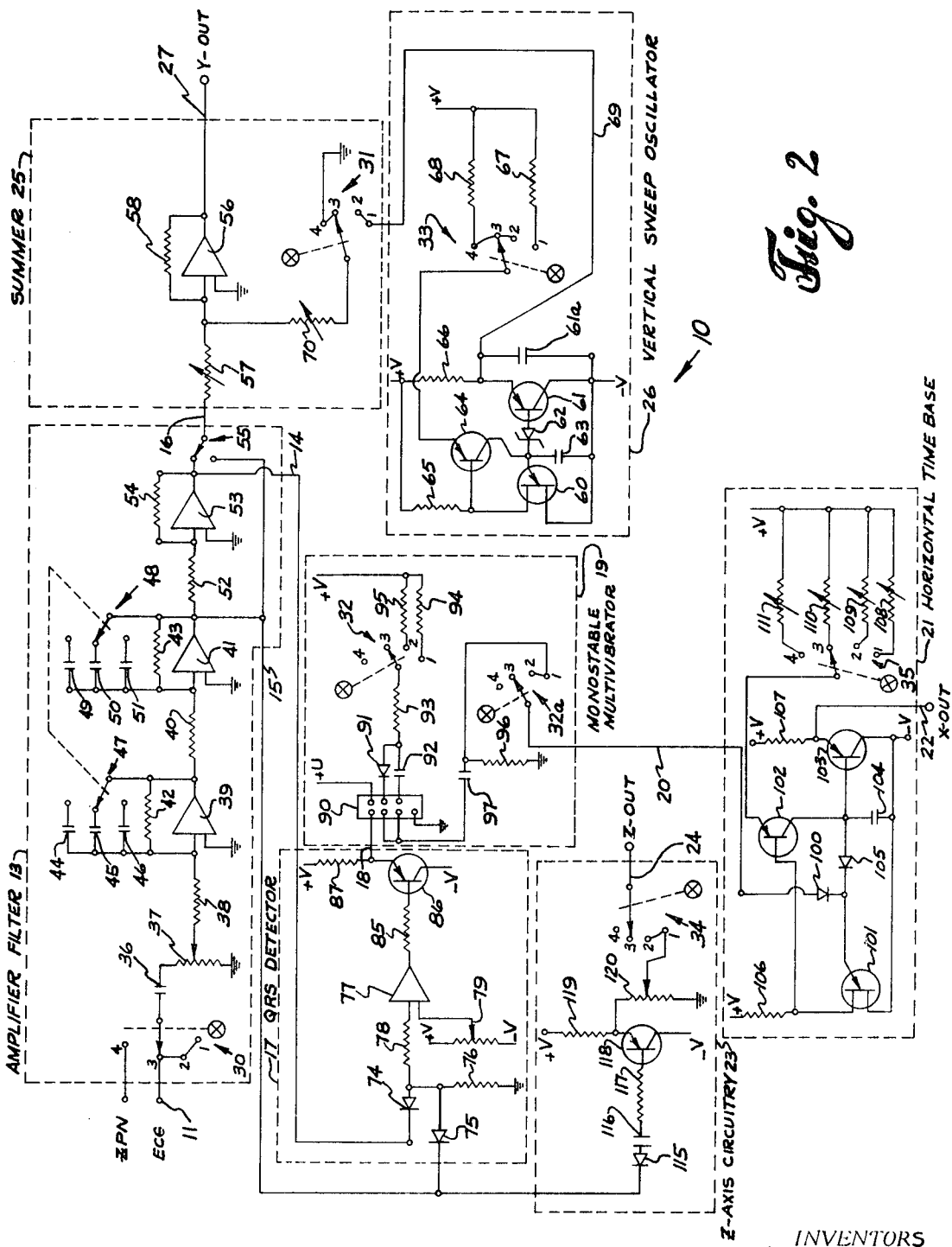

CONTOUROGRAPH SYSTEM FOR MONITORING ELECTROCARDIOGRAMS

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention relates to analytical systems. More specifically, the present invention relates to a contourograph system which is particularly adapted to be employed in long term monitoring of electrocardiac signals and other repetitive analog signals which are semiperiodic in nature. Examples of such repetitive analog signals are the physiological signals associated with intra arterial pressure and respiration.

Contourography involves the display of semiperiodic signals in which the waveform in each cycle of the signal is formed on a separate horizontal base line which is spaced vertically below the base line of the waveform in the preceding cycle. Each succeeding cycle is formed vertically below the same prominent recurring event in the cycle so that similar events in the composite display lie near the same plane. The light intensity of portions of the displayed cycle may also be varied according to variation in the displayed signal or according to a separate signal to enhance the contour effect of the visual display. The visual display is referred to as a "contourogram," while the system or apparatus employed to form the display is referred to as a "contourograph."

As described in detail herein, the contourograph system of the present invention deals particularly with the formation of contourograms from scalar electrocardiographic inputs. The electrocardiogram (ECG) is recorded from the surface of the body and is representative of the electrical activity of the heart. Since it is quasi-periodic, the ECG may be displayed to advantage in contourographic format. One cardiac cycle or heartbeat appears in the ECG as a characteristic series of waveforms which include the "P-wave" associated with atrial depolarization and the beginning of the cardiac cycle, the "QRS-complex" which is the sum of ventricular depolarization and atrial repolarization, and the "T-wave" which is the ventricular repolarization. The durations and amplitudes of these waveforms and the length of the intervals that separate them normally vary only slightly from beat to beat. By displaying the ECG in a contourographic format, information about the electrical activity of the heart is presented in a form that facilitates comparison of each heartbeat with its predecessors. It is anticipated that the invention will be employed for real time monitoring of telemetered astronauts' EKG's.

2. Brief Description of the Prior Art

A variety of devices and systems have been suggested by the prior art for the purpose of processing the electrical signals produced upon the body surface when the cardiac muscle expands and contracts. A well-known diagnostic method involves the measurement of these electrocardiac signals by placing electrodes on the body to detect the signals with additional equipment connected to the electrodes for forming a recorded visual scalar display of the signals. The resulting display is then evaluated for the presence of abnormalities reflected by the presence or absence of characteristic patterns in the waveform.

As an aid to understanding and perceiving changes in the cycle-to-cycle waveform of the electrocardiac signal, it has been suggested by the prior art that the electrocardiac signals may be recorded over a prolonged period of time and subsequently visually presented at a greatly accelerated rate with the waveform of each cycle being superimposed upon the waveform of the preceding cycle. In such a display, variations in the cycle-to-cycle repetition time are eliminated by triggering each cycle of the display from a predetermined portion of the preceding cycle signal so that the waveforms may be made to remain stationary in the composite signal display. By this means, the entire waveforms of succeeding signals in each cycle may be superimposed on each other. The display pattern produced by this technique ensures that substantially identical cycles remain steady while the variation within a given cycle produces a readily discernible change in the pattern. One of the primary shortcomings in the described prior art system is the inability of the system to provide a grouping of continuous visual signal waveforms against which a real time waveform may be evaluated. Moreover, while the superpositioning of cycles forms an improved method for evaluating the monitored signal as compared with direct evaluation of the scalar signal, the composite display formed by the overlapping waveforms prevents or at least complicates cycle-to-cycle evaluation.

One of the major problems associated with production of a visual display of the monitored signals is in the formation of the trace for a given cycle in such a way that only one complete waveform is displayed in a signal real time trace. Where the largest signal excursion, typically the R-wave in the QRS complex, is employed for triggering the trace for forming the real time display, the resultant display shows an RST segment of one cycle and a PQR segment of the next succeeding cycle whereas the desired display should exhibit a single PQRST waveform from onset to termination. One prior art system suggests eliminating the problem of partial cycle displays be detecting and amplifying electrocardiac signals, recording them on a magnetic tape and employing spaced pickup heads in a playback instrument so that the first head will detect the R-wave of a single heartbeat sequence at least as soon as the P-wave portion of the sequence reaches the second pickup head. The R-wave signal detected by the first head is employed to synchronize the sweep of an oscilloscope so that the display of the sequence detected by the second pickup head may be initiated no later than the occurrence of the P-wave. The resulting waveforms in the described system are displayed as overlapping traces on a cathode ray tube. The system requires relatively elaborate playback equipment and is not suited for use in creating real time displays.

The prior art has overcome certain of the previously noted problems by the use of contourography for presenting a visual display in which a cycle-to-cycle comparison may be effectively made. Cathode ray oscilloscopes have been employed as the primary display mechanism in the formation of contourograms of physiological inputs. The contourogram may be generated directly on the face of the cathode ray tube (CRT), on motion picture film moving past the CRT screen, or on a paper output device such as a visicorder. In the prior art systems employing a cathode ray oscilloscope (CRO) as the primary display device, appropriate voltages are applied to the CRO to control X- and Y-development of the trace and the trace intensity. In such systems, the vertical deflection of the CRT beam (Y-axis) is proportional to the amplitude of the input signal ($f(t)$) plus a constant downward sloping ramp ($-kt$) so that the vertical signal as seen by the CRO becomes:

$(V(t)=Af(t)-kt)$. The downward sloping ramp commonly employed to space the horizontal lines vertically apart, is provided by an external sawtooth generator or by motor driven potentiometers. Where photographic or paper strip outputs are employed, the movement of the film or the chart drive provide the desired constant downward sweep.

The horizontal control in the prior art contourograph systems is basically a linear circuit with provision for triggering and resetting the sweep during any portion of the cycle. The trigger is normally derived from a prominent feature of the input signal or from some external source.

When employed with electrocardiac signals, the previously described contourography systems employ the most outstanding amplitude excursion (QRS complex) in the waveform of each cycle to provide the horizontal sweep trigger. Since this major amplitude excursion does not mark the initiation of the cycle, however, the prior art method has required that the horizontal sweep run for two intervals between succeeding significant amplitude excursions in order to place one entire cycle in the center of the resulting display. When this technique is employed, the desired cycle does not appear in the center of the display as a proper part of the contourogram.

A second sweep for the purpose of properly centering the display of the contourogram has been successfully employed. One sweep is employed to trigger on the odd occurrences of the major amplitude excursion in the cycle while the other triggers on the even occurrences. With the latter modification, each cycle appears in the contourogram twice, once divided as a part of the trigger and once appearing in the center of the display.

SUMMARY OF THE INVENTION

The system of the present invention employs an improved triggering arrangement in combination with a variable persistence cathode ray tube to generate continuous contourograms of repetitive analog signals in real time. The improved triggering technique permits formation of a centered, single cycle display which begins and terminates at the beginning and termination respectively of one complete waveform within the cycle even though there is no distinctive waveform event between the termination of one cycle and the initiation of the subsequent cycle which could be employed to trigger the formation of the signal.

The improved triggering circuit of the present invention employs means for initiating a fixed time delay interval upon the occurrence of a significant signal event in one cycle to automatically initiate formation of the real time signal in the succeeding cycle simultaneously with the onset of the waveform in the cycle.

The foregoing and other objects and advantages of the present invention will become more apparent from the following specification and related drawings.

BRIEF DESCRIPTION OF THE DRAWINGS

FIG. 2 is a schematic circuit diagram of the system illustrated in FIG. 1;

DESCRIPTION OF THE PREFERRED EMBODIMENT

Figure 1:
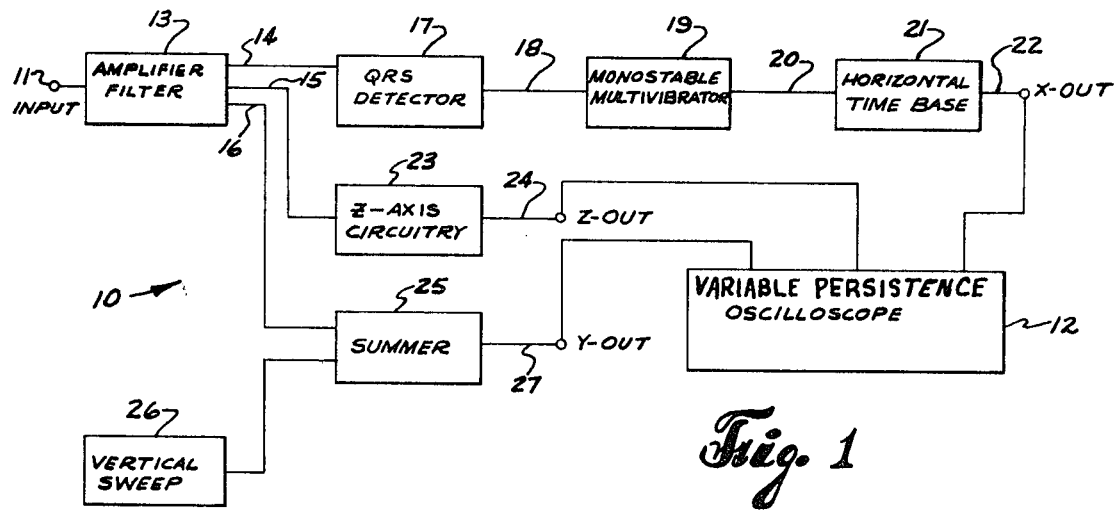
FIG. 1 is a schematic block diagram illustrating the functional components of the system of the present invention specifically adapted for displaying electrocardiac signals in contourographic format.

The contourograph system of the present invention is indicated generally at 10 in FIG. 1. A quasi-periodic, repetitive analog signal introduced to an input terminal 11 of the system 10 is automatically processed by the system to generate continuous contourograms of the signal in real time on the variable persistence cathode ray tube included in an oscilloscope 12.

The signal appearing at the system input 11 is amplified and filtered by a buffer circuit 13. The circuit 13 appropriately amplifies or attenuates the input signal to produce a desired peak-to-peak signal voltage which forms the input to the next stages in the system. The circuit 13 also includes suitable filter circuits which pass input signal components falling within a predetermined frequency range.

The amplified and filtered signal from the buffer circuit is formed on three separate outputs 14, 15 and 16 which respectively lead to the X-, Z-, and Y-axis channels of the system. The output signal appearing on the line 15 is noninverted with respect to the input signal polarity while the signal appearing on the line 14 is inverted. In practice, a polarity reversing function is effected with rectifier diodes connected to both the lines 14 and 15 so that only a positive polarity signal is input to detector circuits in the system as required for triggering of control circuitry in the X-axis channel. The reversing action is dependent upon whether the polarity of the QRS wave in the input signal is predominantly positive or negative. Regardless of QRS polarity, however, a negative going voltage is applied to the passive adding circuitry producing the Z-axis signal while a positive going voltage is always applied to the circuitry producing the X-axis signal.

The need for a negative going voltage input to the circuitry in the Z-axis channel is imposed by the requirements of the external intensity control employed in the oscilloscope 12 which responds to positive voltage by decreasing brightness (blanking). The contour effect which is enhanced by modulation of the light intensity of the visual display is produced by intensification of peaks in the waveform. This requires that the Z-axis voltage swing toward zero from its ambient positive voltage to produce the greatest light intensity at the waveform peaks. A relatively small positive ambient voltage is retained in the Z-axis signal to partially blank the base line of the signal produced in the oscilloscope 12.

The positive polarity signal appearing on the output line 14 from the circuit 13 forms the input to a QRS detector 17 which is employed to detect the QRS complex in the signal waveform of each cycle. Upon detection of the QRS complex, the detector 17 forms an output signal on line 18 which is employed to trigger a monostable multivibrator 19 (one-shot delay). The multivibrator 19 includes an active period which may be adjusted to provide a desired time delay between the occurrence of the detector signal on the line 18 and termination of the active period. Termination of the active interval of the multivibrator 19 forms a trigger signal on line 20 which is employed to control generation of a resweep signal in a horizontal time base circuit 21. When appropriately triggered, the circuitry 21 forms a resweep signal on output line 22 which provides the X-axis or horizontal input to the oscilloscope 12.

The negative signal appearing on line 15 forms the input to Z-axis circuitry 23 which sums the negative going QRS signal with a positive blanking voltage and provides the output on line 24. As previously noted, the output signal provides the light intensity modulation signal for the Z-axis input of the oscilloscope 12.

The Y-axis input is provided by summing circuit 25 which combines the noninverted output signal appearing on the line 16 with the output signal from a vertical sweep oscillator 26. The combined signal is formed on a line 27 and provides the vertical (Y-axis) input to the oscilloscope 12.

Figure 4:
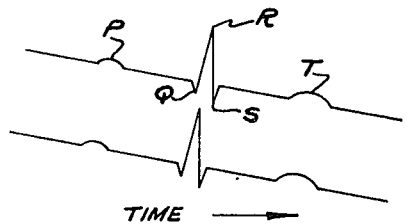
FIG. 4 is a real time contourogram illustrating the time relationship between vertical and horizontal sweeps producing the output display.
Figure 5:
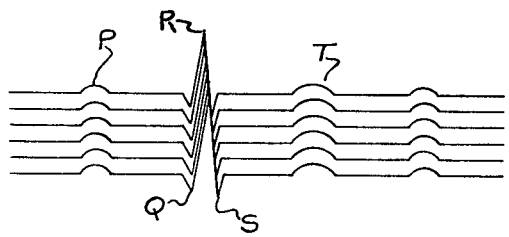
FIG. 5 illustrates a contourogram of normal electrocardiac signals as presented by the system of the present invention.

In operation, the system 10 of the present invention provides an oscilloscope trace exhibiting one complete electrocardiac beat per line as illustrated in FIGS. 4 and 5. The single full trace display is effected by starting the horizontal time base sweep before the P-wave in the signal and extending it just beyond the end of the T-wave. The resulting display on the cathode ray tube of the oscilloscope 12 contains the smallest repetitive unit of cardiac activity in real time sequence. The resweep trigger signal is delayed following generation of the QRS complex in the waveform for an interval which is slightly longer than the QRST interval. The QRST interval is relatively stable over a wide range of heart rate and a constant delay places the resweep trigger pulse reliably in the T-P pause between cycles so that an ideal real time contourogram can be generated.

Figure 3:
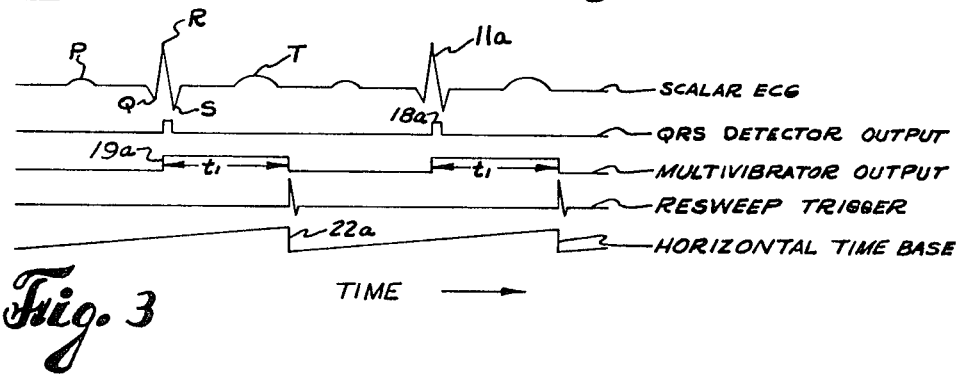
FIG. 3 is a composite timing diagram illustrating the respective forms of the control signals in the system of the present invention and their timing with respect to the electrocardiogram being monitored.

FIG. 3 illustrates the time relationship between the input electrocardiac signal and the signals formed by the components in the X-axis channel of the system 10 which provide the desired real time display. The input electrocardiac signal represented by curve 11a is illustrated at the top of FIG. 3 which shows time increasing to the right. Characteristic cyclical waveforms PQRST are marked on curve 11a for two succeeding cycles. The QRS detector output signal represented by curve 18a includes a narrow rectangular pulse which is produced substantially simultaneously with the occurrence of the QRS complex in the scalar ECG curve 11a. Occurrence of the pulse in the QRS detector output curve 18a triggers the multivibrator 19 to its unstable state for an active period identified at $t_1$ in curve 19a. Termination of the rectangular waveform produced during the period $t_1$ shown in the curve 19a produces a spiked resweep trigger pulse output from the multivibrator circuit 19 as illustrated by curve 19a. Occurrence of the resweep trigger pulse initiates start of a sawtooth waveform output 22a from the circuitry 22 to produce the next sweep trace for the visual display of the oscilloscope 12. In each case it may be noted that the scalar ECG waveform in any cycle of the signal being monitored is directly related in real time to the horizontal time base voltage employed to produce the visual trace on the oscilloscope. Consequently, a single cycle, real time display of the electrocardiac signal is produced in the trade of the oscilloscope 12.

Referring to FIG. 4 in the Y-axis control equation, $Y(t)=F(t)-kt$, the downward sloping ramp, "$-kt$," is provided by the operation of the vertical sweep oscillator 26 which produces a low frequency sawtooth waveform causing the trace to move down the CRT face until the bottom of the screen is reached. When operating in this mode, the sawtooth resets once it reaches the bottom of the screen and the trace is returned to its starting point near the top of the screen. The variable persistence control of the oscilloscope is also adjusted so that the uppermost trace in the preceding vertical sweep has faded out before the first trace of the subsequent sweep is formed. Heart rate is shown immediately by the length of the display along the X-axis.

FIG. 2 illustrates a preferred form of the circuitry employed in the contourograph system of the present invention. The specific circuit components forming the major functional portions of the system 10 have been generally confined within separate dotted line enclosures having the same reference characters as the corresponding portions described previously in FIG. 1.

In operation, the signal appearing on the input terminal 11 of the amplifier filter circuit 13 is initially conveyed to a four position, rotary mode switch indicated generally at 30. The movable switching contact of the switch 30 is ganged for simultaneous movement with the movable switching contacts on similar, four position rotary mode switches 31, 32, 32a, 33, 34, and 35 in other portions of the system 10. For purposes of clarity, the mechanical ganging of the switching components in the switches 30 through 35 has been schematically illustrated by the conventional dotted line ganging indicia which terminates in an encircled X. By appropriately positioning the movable switching contacts of the ganged switches in the first through fourth switching positions, the system 10 may be placed in the slow contourography (CGPH), fast CGPH, scalar ECG, or scalar ZPN, modes respectively. The slow CGPH mode provides a horizontal sweep speed which completes a single trace in approximately 2 seconds to allow contourogram of ECG's at heart rates of 30 to 60 beats per minute (bpm) to be effectively displayed. The fast CGPH mode, in turn, has a one second horizontal sweep providing optimal contourograms of ECG's at 60 to 120 bpm heart rate. The scalar ECG mode presents the 25 mm./second standard clinical display with no vertical sweep, resweep triggering or intensity modulation. Similarly the scalar ZPN mode presents an impedance pneumogram (respiration indicator) in a scalar manner.

The signal appearing on the movable contact of the switch 30 is conveyed to an input circuit formed from the series connection of a capacitor 36 and the grounded resistive element of a potentiometer 37. The output signal on the tap of potentiometer 37 is conveyed through a series resistor 38 to the first stage 39 of a two-stage amplifier circuit. The amplified signal appearing on the output of the first amplifier stage 39 is transmitted through a series input resistor 40 to the second amplifier stage 41. The amplifier stages 39 and 41 are provided with stabilizing resistive feedback loops formed by resistors 42 and 43, respectively. The first amplifier stage 39 is also equipped with capacitors 44, 45, and 46 which are employed as a first stage filter to subdue undesired noise components in the input signal. A switch indicated generally at 47 may be appropriately adjusted to vary the capacitance value of the first stage filter circuit. The movable switching element of the switch 47 is mechanically ganged with the movable switching element of a second switch indicated generally at 48 which may be electrically positioned to include capacitors 49, 50, or 51 in a second stage filter network.

The amplified and filtered output from the second stage amplifier 41 is formed on the output line 15 from the amplifier filter circuit 13 where it is conveyed to the Z-axis circuitry 23. The signal is also introduced through a series input resistor 52 to an operational amplifier 53. The amplifier 53 is equipped with a stabilizing feedback loop which includes a resistor 54. The signal output from the operational amplifier 53 is conveyed to one terminal to a two position QRS polarity selection switch indicated generally at 55. The signal appearing at the output of the amplifier 53 is also formed on the output line 14 which in turn conveys the signal to the QRS detector circuit 17.

From an inspection of the arrangement of the components in the amplifier filter circuit 13, it will be evident that the signal appearing at the output of the second amplifier stage 41 has the same polarity as the input signal appearing on the input terminal 11. On the other hand, the operational amplifier 53 reverses the polarity of the signal appearing at its input so that the resultant signal appearing at the output of the amplifier 53 is reversed in polarity with respect to the polarity of the signal appearing at the system input 11.

The signal appearing on the output line 16 is introduced into a summing amplifier 56 through a variable input resistor 57. A resistor 58 is included in a feedback loop in the amplifier 56.

The input signal from the amplifier filter network 13 is summed in the summing network 25 with the signal from the vertical sweep oscillator 26. The vertical sweep oscillator circuit includes a unijunction transistor (UJT) sawtooth generator in which a UJT 60 is directly coupled to a PNP-transistor 61 through a zenor diode 62. A capacitor 61a is connected between the cathode and emitter of the transistor 61. The charging circuit for the oscillator circuit is formed by a capacitor 63 connected between the emitter of the UJT 60 and the negative supply voltage. A common base transistor 64 is connected in the circuit as illustrated so that its high-output impedance may be employed to maintain a constant charging current for the capacitor 63. Resistors 65 and 66 are connected between the positive supply voltage and the base of the transistor 64 and the emitter of the transistor 61, respectively. Resistors 67 and 68 are connected between the positive supply voltage and the stationary switching terminals of the rotary switch 33. When the movable element of the switch 33 is in the first switch position, resistor 67 is active in the circuit and when the contact is on positions 2, 3 or 4, resistor 68 is in the circuit. By appropriately adjusting the position of the movable element in the rotary switch 33, the voltage supplied to the emitter of the transistor 64 may be varied according to the respective resistance values of resistors 67 and 68. This in turn regulates the charging time of the capacitor 63 to vary the frequency of oscillation. The output signal of the vertical sweep oscillator 26 is developed across the resistor 66 and is communicated along the output line 69 to the rotary switch 31. As indicated in the illustration, when the movable contact of the switch 31 is in position with the fixed switching contacts 1 or 2, the output signal from the vertical sweep oscillator 26 is conveyed to the input of the summing amplifier 56 through a variable resistor 70. When the movable switching contact is in positions 3 or 4, the series resistive circuit is grounded and the sole input to the amplifier 56 is the signal appearing on the line 16.

The amplified and inverted signal appearing on the line 14 is supplied to the cathode of a rectifier diode 74 forming an input to the QRS detector 17. The amplified, noninverted signal appearing on a line 15 is also supplied to the input of the QRS detector through the cathode of a second rectifier diode 75. It will be appreciated that the diodes 74 and 75 cooperate to pass the signal having the positive going voltage with the resulting signal being developed across a grounded resistor 76 to form the input to a differential amplifier 77 through a series input resistor 78. The second input to the amplifier 77 is formed from the movable tap of a potentiometer 79 having its resistive element connected between the positive and negative supply voltages.

The output signal from the amplifier 77 is conveyed through a series resistor 85 to a PNP-transistor 86. A resistor 87 connects the positive supply voltage to the emitter of the transistor and the cathode of the transistor is connected to the negative supply voltage. When biased into conduction by detection of the QRS complex in the input signal, the transistor 86 forms a trigger pulse on the output line 18 forming the input to the monostable multivibrator circuit 19.

The monostable multivibrator employed in the circuit 19 is indicated in black box form at 90. The multivibrator 90 which is conventional has been modified by the addition of a circuit including a diode 91 and a capacitor 92 connected through a series resistor 93 to the movable switching contact of the switch 32. The contact in the fourth and third positions of the switch 32 are merely open circuits while the contacts in the first and second positions are connected to resistors 94 and 95, respectively, having their opposite ends connected to the positive supply voltage.

It will be appreciated that by appropriately adjusting the movable contact of the switch 32, the active period of the multivibrator may be adjusted. The output from the multivibrator 90 is taken through an RC-circuit which includes a grounded resistor 96 and a series capacitor 97. The signal developed across the resistor 96 is conveyed to the first and second terminals of the rotary switch 32a. Terminals 3 and 4 of the switch 32a are also open circuited. The signal appearing on the movable switching contact of the switch 32a is conducted on line 20 to form the input to the horizontal time base circuit 21 which includes a UJT oscillator circuit similar to that in the vertical sweep oscillator 26. The input signal on the line 20 is input to the circuit through a diode 100 having its cathode connected to the emitter of a UJT 101. The circuit also includes two transistors 102 and 103, a charging capacitor 104 and a blocking diode 105. The positive supply voltage is provided to the oscillator through resistors 106 and 107. Charging of the capacitor 104 is controlled by the current regulating operation of the transistor 102 which has its emitter connected to the rotary switch 35. Each of the contacts in switch positions 1-4 is connected to a variable resistor 108, 109, 110, and 111 respectively with the opposite ends of the variable resistors being connected to the positive supply voltage. The resistive values of each of the resistances 108-111 are independently adjustable and the movable contact of the switch 35 may be adjustably positioned to the various switching positions to change the current flow through the transistor 102 when it is biased into conduction to thereby vary the frequency of oscillation of the circuit. The output of the circuit is formed on the line 22 and is employed as the X-axis input to the associated oscilloscope.

The noninverted signal appearing on the line 15 is input to the Z-axis circuitry through a series circuit formed by a rectifier diode 115, a capacitor 116 and a resistor 117. The resistor 117 is connected to the base of a PNP-transistor 118 having its emitter connected through a resistor 119 to the positive supply voltage. The output signal developed across resistor 119 is conveyed to a potentiometer 120 having its movable tap connected to the first and second terminals of the rotary switch 34. As shown, switching positions three and four of the switch 34 are short circuited.

In one form of the invention illustrated in FIG. 2, the following components were employed:

RESISTORS

| Reference character: | Rating in ohms |
|---|---|
| 37 | 35 K |
| 38 | 10 K |
| 42 | 100 K |
| 40 | 10 K |
| 43 | 100 K |
| 52 | 10 K |
| 54 | 10 K |
| 57 | 1 m |
| 58 | 10 K |
| 65 | 1.8 K |
| 66 | 100 K |
| 67 | 220 K |
| 68 | 330 K |
| 70 | 100 K |
| 76 | 10 K |
| 78 | 1 K |
| 79 | 50 K |
| 85 | 47 K |
| 87 | 22 K |
| 93 | 6.8 K |
| 94 | 18 K |
| 95 | 27 K |
| 96 | 22 K |
| 106 | 820 |
| 107 | 100 K |
| 108 | 20 K |
| 109 | 50 K |
| 110 | 100 K |
| 111 | 200 K |
| 117 | 8.2 K |
| 119 | 20 K |
| 120 | 1 m |

CAPACITORS

| Reference character: | Rating in microfarads |
|---|---|
| 36 | 100 |
| 44 | .01 |
| 45 | .027 |
| 46 | .05 |
| 49 | .01 |
| 50 | .027 |
| 51 | .05 |
| 63 | 66 |
| 92 | 50 |
| 97 | .01 |
| 104 | 15 |
| 116 | 50 |

Amplifiers

| Reference character | Manufacturer | Specifications |
|---|---|---|
| 39, 41, 53, 56 | Motorola | MC 1533G |
| 77 | Fairchild | A709 |

Transistors

| | Manufacturer | Specifications |
|---|---|---|
| 61, 64, 86, 102, 103, 118 | Control Data Corp | 2N 3638 |

Unijunction transistors

| | Manufacturer | Specifications |
|---|---|---|
| 60, 101 | Texas Instruments | ZN 1671A |

Diodes

| | Manufacturer | Specifications |
|---|---|---|
| 62 | Sylvania | 6V Zener reference |
| 74, 75, 91, 100, 105, 115 | do | 1N2069 |

Multivibrator

| | Manufacturer | Specifications |
|---|---|---|
| 90 | Fairchild | 9601 |

Oscilloscope

| | Manufacturer | Specifications |
|---|---|---|
| 12 | Hewlett-Packard | H12-1208B |

The foregoing disclosure and description of the invention is illustrative and explanatory thereof, and various changes in the size, shape, and materials, as well as in the details of the illustrated construction, may be made within the scope of the appended claims without departing from the spirit of the invention.

What is claimed is:

1. In a contourograph system for processing periodic or semiperiodic input signals to produce a real time video display in a variable persistence oscilloscope, the improvement comprising:

detection means for detecting a first recurring event in a first cycle of periodic or semiperiodic input signal and forming a detector output signal indicative of the presence of said first event;

delay means connected with and responsive to said detection means for initiating a delay output signal at a fixed delay time following occurrence of said detector output signal, said delay means providing a delay time interval which terminates at the end of the waveform in said first cycle and before the onset of the waveform in said second cycle whereby a complete real time waveform for only one cycle of said input is formed by said oscilloscope traces, and is indicative of instantaneous heartbeat rate;

display control means connected with said detection and delay means for initiating formation of a trace producing sweep signal representing the X-axis input in said oscilloscope upon the occurrence of said delay output signal whereby said sweep occurs substantially simultaneously with the occurrence of a second, later cycle in said input signal to produce a real time oscilloscope trace of the waveform of said second cycle;

intensity control circuit means for providing a Z-axis input to the oscilloscope for varying the intensity of the oscilloscope trace as a function of the input signal amplitude to thereby produce greatest light intensity at the waveform peaks;

summing circuit means for combining said input signal with a repetitive, fixed time duration, amplitude variant signal to produce a Y-axis input for said oscilloscope for producing vertically spaced oscilloscope traces of waveforms in succeeding cycles of said input signal; and first adjustment means for varying the length of said delay time to permit said system to be adjusted for use with different input signals having varying wavelengths.

2. The contourograph system as defined in claim 1 further including variable persistence control means for adjusting the persistence of said traces whereby the uppermost trace in the sequence of vertical sweeps fades immediately prior to the formation of the first trace of the subsequent sweep.

3. The contourograph system as defined in claim 1 further including:

means for adjusting the horizontal sweep speed of said oscilloscope for operation in a selected one of a slow mode and a fast mode to allow a contourograph display of electrocardiac signals corresponding to a low range of heartbeat rates and a higher range of heartbeat rates, respectively.

4. A contourograph system as defined in claim 1 further including:

a. input signal processing means for amplifying or attenuating said input signal to form a processed signal having amplitude excursions confined between preestablished limits; and b. filter means included with said input signal processing means for removing undesired frequency components in said input signal.

5. The contourograph system as defined in claim 1 wherein said detector means includes means for detecting the QRS complex in an electrocardiac signal.

* * * * *